United States Patent
Bacon (10) Patent No.: US 12,495,405 B2
(45) Date of Patent: Dec. 9, 2025

(54) METHODS AND SYSTEMS FOR DYNAMIC RF BAND ALLOCATION

(71) Applicant: Murata Manufacturing Co., Ltd., Nagaokakyo (JP)

(72) Inventor: Peter Bacon, Derry, NH (US)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 344 days.

(21) Appl. No.: 18/170,447

(22) Filed: Feb. 16, 2023

(65) Prior Publication Data

US 2023/0276418 A1    Aug. 31, 2023

Related U.S. Application Data

(63) Continuation of application No. PCT/US2021/071240, filed on Aug. 20, 2021.

(60) Provisional application No. 63/068,782, filed on Aug. 21, 2020.

(51) Int. Cl.
| | |
|---|---|
| *H04W 72/0453* | (2023.01) |
| *H04B 1/00* | (2006.01) |
| *H04W 72/1268* | (2023.01) |
| *H04W 72/1273* | (2023.01) |

(52) U.S. Cl.
CPC ...... *H04W 72/0453* (2013.01); *H04B 1/0075* (2013.01); *H04W 72/1268* (2013.01); *H04W 72/1273* (2013.01)

(58) Field of Classification Search
None
See application file for complete search history.

(56) References Cited

U.S. PATENT DOCUMENTS

| | | |
|---|---|---|
| 2006/0002501 A1 | 1/2006 | Muller |
| 2008/0130685 A1 | 6/2008 | Rogerson et al. |
| 2010/0197249 A1 | 8/2010 | Rajkotia et al. |
| 2012/0106490 A1* | 5/2012 | Nakashima ........... H04W 52/42 370/329 |
| 2016/0329879 A1 | 11/2016 | Wilkerson |
| 2019/0124645 A1* | 4/2019 | Huang ................ H04W 72/21 |
| 2019/0222242 A1* | 7/2019 | Frank .................... H04B 1/109 |
| 2024/0040601 A1* | 2/2024 | Iyer ....................... H04L 1/0003 |

FOREIGN PATENT DOCUMENTS

| | | |
|---|---|---|
| EP | 1085680 A2 | 3/2001 |
| KR | 20010050445 A | 6/2001 |

OTHER PUBLICATIONS

International Search Report and Written Opinion for International Application No. PCT/US2021/071240 filed Aug. 20, 2021 on behalf of Psemi Corporation, Mail Date: Jan. 26, 2022 (14 pages).
International Preliminary Report on Patentability for International Application No. PCT/US2021/071240 filed Aug. 20, 2021 on behalf of Psemi Corporation, Mail Date: Mar. 2, 2023. (11 pages).

\* cited by examiner

*Primary Examiner* — The Hy Nguyen
(74) *Attorney, Agent, or Firm* — Steinfl + Bruno LLP (57) ABSTRACT

Methods and systems for frequency band allocation are provided. A tunable/selectable passband filter is disclosed that changes based on the time and location of the user equipment. Additionally, a method of allocating and optimizing upload and download bands is provided to mitigate inter-modulation distortion due to intermodular distortion effects from strong uplink channels.

17 Claims, 12 Drawing Sheets

| Modulation | POUT (dBm) | CW IMD3 (dBm) | ΔIMD3 / ΔPOUT ratio | OFDM ACLR (dB) | ΔACLR / ΔPOUT ratio |
|---|---|---|---|---|---|
| $P_{QPSK}$ | 0.0 | -36.65 | - | 25.44 | - |
| $P_{16QAM}$ | -1.55 | -46.46 | 4.91 | 33.98 | 4.27 |
| $P_{64QAM}$ | -1.99 | -48.89 | 4.86 | 36.04 | 4.12 |
| $P_{256QAM}$ | -3.85 | -58.55 | 4.84 | 44.08 | 4.02 |

FIG. 5A

| Modulation | n71 (dBm) | n66 (dBm) | cBW (MHz) | MSD CB2 DL (dB) | ASD CB2 DL (dB) |
|---|---|---|---|---|---|
| $P_{QPSK}$ | 20 | 20 | 5 | 2.50 | 5.58 |
| $P_{16QAM}$ | 18 | 18 | 5 | 0.50 | 1.50 |
| $P_{64QAM}$ | 17.5 | 17.5 | 5 | 0.32 | 0.98 |
| $P_{256QAM}$ | 15.5 | 15.5 | 5 | 0.05 | 0.17 |

FIG. 5B

| n71 | n66 | cBW (MHz) | MSD CB2 DL (dB) | ASD CB2 DL (dB) | delta (dB) |
|---|---|---|---|---|---|
| $C_{I\_n71}=3$ | $C_{I\_n66}=1$ | | | | |
| $P_{QPSK}$ | $P_{QPSK}$ | 5 | 2.50 | 5.58 | - |
| $P_{QPSK}$ | $P_{16QAM}$ | 5 | 1.69 | 4.16 | 1.42 |
| $P_{16QAM}$ | $P_{QPSK}$ | 5 | 0.77 | 2.18 | 3.40 |

METHODS AND SYSTEMS FOR DYNAMIC RF BAND ALLOCATION

CROSS-REFERENCE TO RELATED APPLICATIONS

The present application is a continuation of PCT application PCT/US2021/071240 filed on Aug. 20, 2021, which in turn claims priority to U.S. Provisional Patent Application No. 63/068,782 filed on Aug. 21, 2020, the contents of both of which are incorporated by reference herein in their entirety.

FIELD

The present disclosure is related to RF (radio frequency) band allocation, more in particular to methods and devices to dynamically assign/choose bands and sub-bands for RF use by RFFE (RF front-end) devices.

BACKGROUND

The RF spectrum is a shared resource for communication. To avoid interference between services, the spectrum is divided up into frequency bands and sub-bands which are then allocated for transmission and reception of RF signals. Allocation is both a political and regulatory matter (allocation to services by government entities, or the equivalent) and a technical matter (allocation by base station or user equipment for best reception). Issues for RF allocation include the fact that political allocation can change over time and over different geographic regions, as well as the fact that transmission of signals over selected transmission bands can produce non-linear mixing intermodulation products and harmonics that can cause intermodulation distortion and degrade receiver sensitivity.

SUMMARY

The disclosed methods and devices address the described challenges and provide practical solutions to the above-mentioned problems.

In a first aspect of the disclosure, a tunable filter is disclosed configured to: select a passband over a first frequency band and a second frequency band, where the first band overlaps the second band; determine a current time of the tunable filter; determine a location of the tunable filter; compare the current time to a time of band availability for a region; and when the current time is equal to or after the time of band availability and the location is in the region, adjust the passband to cover frequencies made available at the time of band availability for the region. The passband can be a 3 dB passband.

In a second aspect of the disclosure, a tunable filter is disclosed with a nominal passband having a selectable center frequency, the tunable filter configured to: determine a current time of the tunable filter; determine a location of the tunable filter; and select a center frequency of the nominal passband based on the current time, the location, and a sequential time of frequency availability based on region. The nominal passband can be a nominal 3 dB passband.

In a third aspect of the disclosure, a selectable filter is disclosed with a plurality of nominal passbands each with different center frequencies, the selectable filter configured to: determine a current time of the tunable filter; determine a location of the tunable filter; select a nominal passband from the plurality of nominal passbands based on the current time, the location, and a sequential time of frequency availability based on region. The nominal passbands can be 3 dB passbands.

In a fourth aspect of the disclosure, a method is disclosed for reducing self-desense in a downlink band due to two or more uplink bands of an uplink transmission, the method comprising: selecting two or more uplink bands; selecting a downlink band for a device using the two or more uplink bands; determining, by computation or retrieval or direct measurement, intermodulation distortion values for available uplink band combinations and available downlink bands; using the intermodulation distortion values to determine if there is intermodulation distortion for the downlink band given the two or more uplink bands; determining link margins of each of the two or more uplink bands by link budget estimation or retrieval or direct measurement; and increasing the modulation order of one or more uplink bands of the two or more uplink bands that has a greatest link margin. The method can be a computer-implemented method, or realized in hardware or firmware, or some combination thereof. Further aspects of the disclosure are provided in the description, drawings and claims of the present application. Incorporated with this disclosure is the disclosure provided in attached Appendix A.

DESCRIPTION OF THE DRAWINGS

FIGS. 1A-1C shows examples of passband allocation and adjustment.

DETAILED DESCRIPTION

Time and Geography Allocation

User equipment (UE) for radio frequency communications through a base station requires filters (e.g., bandpass, high pass, low pass) to avoid interference between the frequency bands allocated by the local authority (e.g. government) for use by the UE for a given communications service for the region the UE is in. For example, cellphones set for US network communications will have a passband set up for U.S. cellphone communications within the US.

Figure 1A:
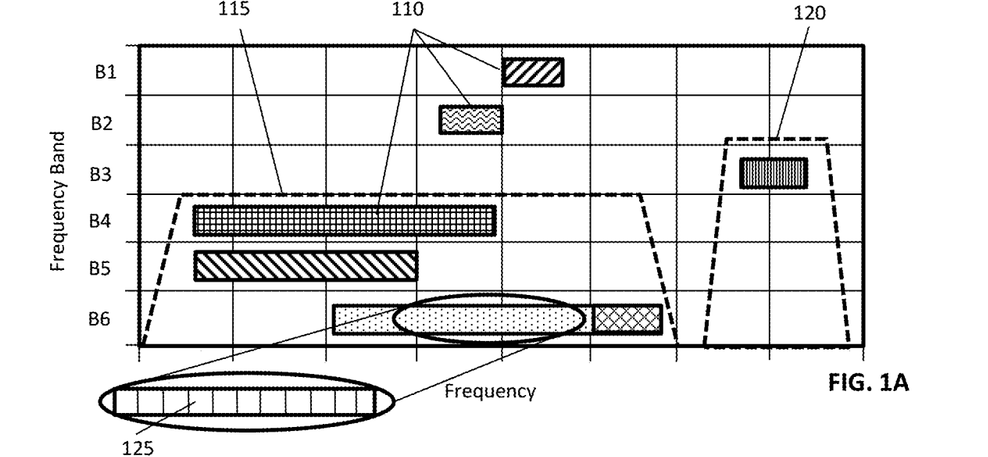
FIG. 1A shows a series of frequency bands and passbands of filters covering parts of those bands.

FIG. 1A shows an example configuration of different frequency bands 110 allocated for different regions and services/operators, and example passbands 115, 120 used by a UE. For this example, bands B1 and B2 represent different service types for a first region (e.g., KDDI and SFBK for Japan), and B3-B6 represent different service types for a second region (e.g. n79, n77, n78, and C-band for US). A frequency band 110 might be further subdivided into sub-blocks or sub-bands 125. A first passband 115 may be established for three bands in the second region and a second passband 120 may be established for the remaining band in the second region. In some embodiments, the passband is a 3 dB passband. A 3 dB passband corresponds to a frequency band over which the gain or insertion loss stays within 3 dB of the maximum gain or insertion loss.

Figure 1B:
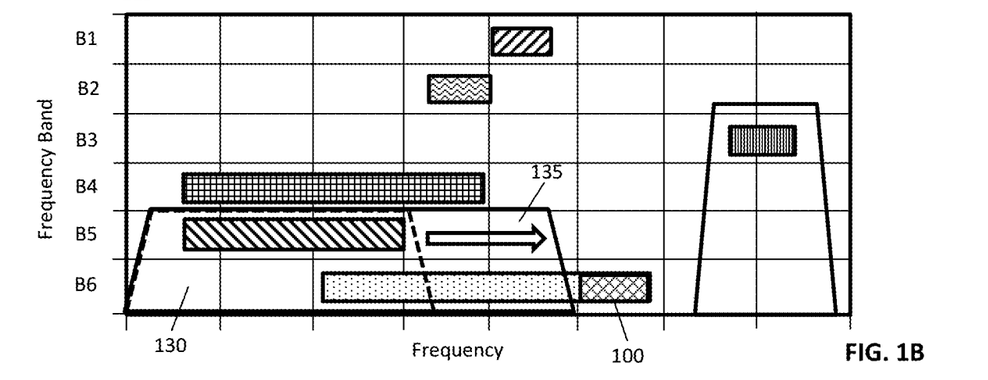
FIG. 1B shows an adjustment of a passband upon a new frequency allocation availability for a region (location).

Since the allocation of available frequency sub-bands can change over time for different regions (e.g., the government rolling out frequency availability over time), some embodiments include the ability to adjust the passband over time to accommodate newly allocated spectrum in a region. FIG. 1B shows and example of adjusting a passband for a filter in a UE. An initial passband 130 is established for a given region based on a first frequency allocation in a first time period (e.g. allocation before a transition date). In a second time period (e.g. after or on a transition date), the filter adjusts 135 a passband to accommodate the newly allocated spectrum. For example, the initial passband may include first part of the C-band spectrum in the US, i.e., the CB1 frequency band between 3.7 and 3.8 GHz, expected to be licensed by FCC for use at the start of a first time period, and the newly allocated spectrum may correspond to the CB2 band between 3.8 and 3.98 GHz that is expected to be licensed by FCC after or on a transition date starting the second time period. In some embodiments the initial passband is about 3300-3800 MHz before a time of expanded band availability (e.g., in accordance with regulatory authority) and the passband is adjusted to about 3300-4000 MHz at or after the time of expanded band availability. As used herein and in the claims, "about" refers to within a 10% margin. In some embodiments, the filter can also contract a passband to accommodate a reduction in spectrum allocation. In some embodiments, the adjustment 135 allows the filter range to avoid a particular adjacent band 100 allocated to other services (e.g., consolidated fixed satellite services FSS in the US).

In an embodiment, instead of adjusting a passband, the filter has a number of nominal passbands to select from, and the region and time is used to select a center frequency of the passbands.

Figure 1C:
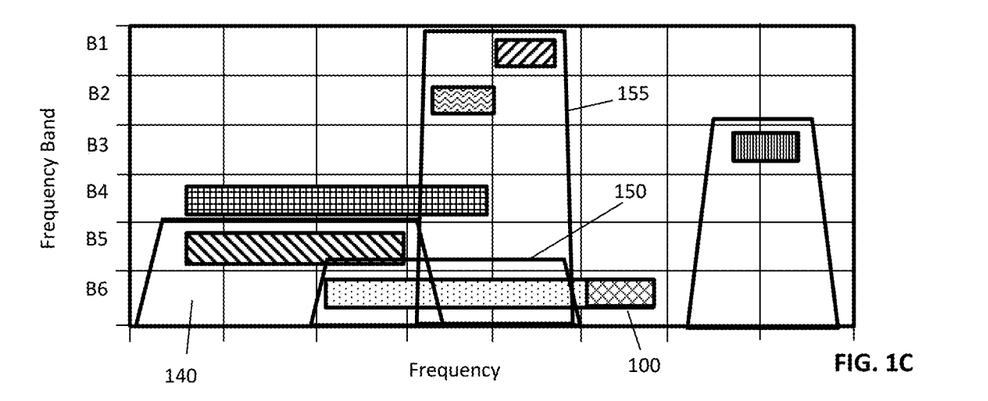
FIG. 1C show passbands by region and time.

FIG. 1C shows an example of selectable/tunable filters for geography and time. For example, a UE filter can be configured to select between a legacy (e.g. before a given date) passband 140 for the second region, a new (e.g. after a given date) passband 150 for the second region, or a passband for the first region 155. Thereby, selecting passbands based on both time and location or region. In some embodiments, the adjustment allows a filter range 140, 150, 155 to avoid a particular adjacent band 100 allocated to other services (e.g. satellite).

To determine passband adjustment/center frequency/selection based on time, the UE filter in the relevant embodiments has the capability to determine the time and/or date of the UE so it can be compared to a programmed transition time/date (e.g. date and time of new spectrum allocation). This can be accomplished by a local world clock on the UE, or it can be pushed to the UE from a base station.

To determine passband adjustment/center frequency/selection based on location, the UE filter in the relevant embodiments has the capability to determine the location of the UE so it can be compared to a list of programmed regions (e.g. which country/region the UE is in). This can be accomplished by a local global positioning system (GPS) on the UE, or it can be pushed to the UE from a base station.

IMD Avoidance

Another issue with band allocation in UEs is intermodulation distortion (IMD) between transmission and receive bands. When the UE is far from the base station, it might increase the transmission power of its transmission over uplink (UL) bands (channels) to maintain high fidelity at high bit rates. Transmission over multiple transmission channels with high average transmission power can cause a sensitivity degradation, i.e., self desense, in the UEs receiver (downlink, DL) due to intermodulation products (for example, harmonics) created by the uplink transmissions in the downlink channel's frequency range.

Figure 2:
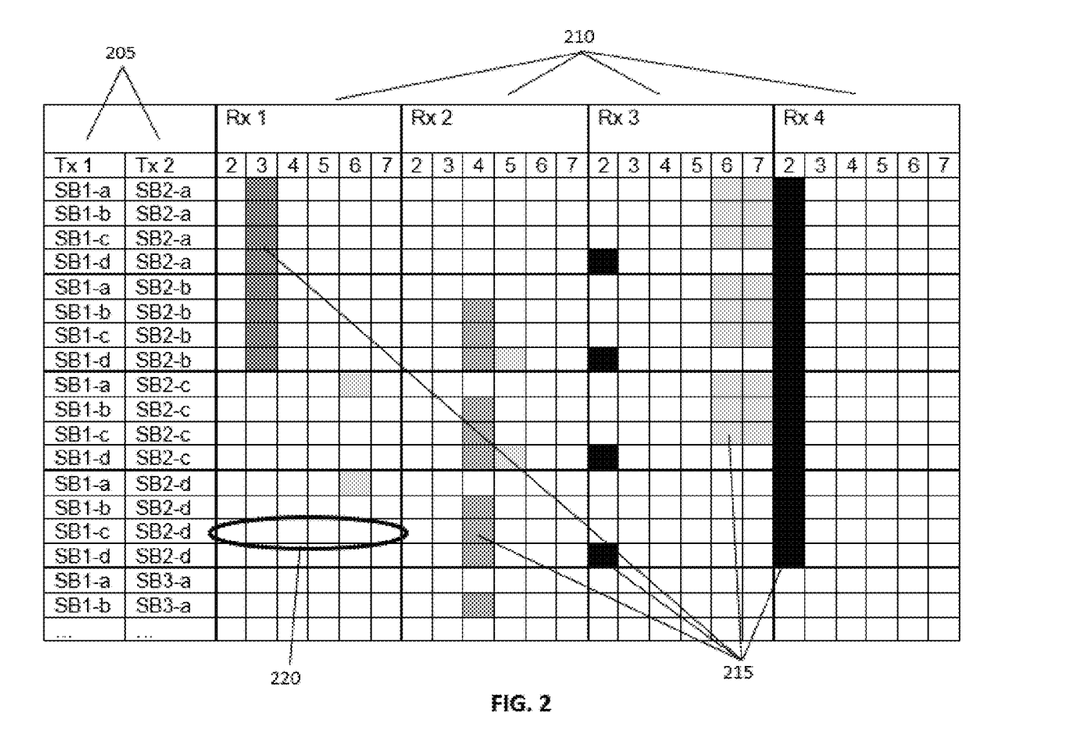
FIG. 2 shows an example aggressor vs. victim chart where the aggressor transmit channels (frequency bands/sub-bands) cause inter-modulation distortion (IMD) in the victim receive channels.

FIG. 2 shows an example chart of uplink (Tx) "aggressor" channels 205 and their respective sub-bands (SB1-a, SB1-b, SB1-c, SB1-d, SB2-a, etc.) and their resulting IMD effects on downlink (Rx) "victim" bands 210 (Rx 1, Rx 2, Rx 3, and Rx 4) in the $2^{nd}$ through $7^{th}$ order intermodulation products. Some IMD effects 215 are more severe than others, based on the IMD overlap on the Rx band: generally, the lower the IMB order, the greater the potential distortion. As the order increases, the bandwidth of the resulting IMD increases spreading the power of the IMD product across a greater bandwidth. For IMD products having the same total power but different orders, the power spectral density of the higher order IMB will be less than that of the lower order. The uplink/downlink relationships can be split into "clean" and "interfering". In some embodiments, a "clean" band 220 is a downlink band where the corresponding uplink channel frequencies do not cause an IMD product to fall in the Rx downlink band, and an "interfering" relationship is a combination of uplink channel frequencies that do cause an IMB product 215 to fall in the Rx downlink band. In some embodiments, a "clean" band only needs to be free of distortion effects in a few of the lower IMDs. For example, a band with distortions only in the $5^{th}$-$7^{th}$ IMB could also be considered "clean" because the distortion in those IMDs might be considered to be insignificant for a given application.

Ideally, the UE selects uplink and downlink channels/sub-bands to provide only clean bands, but that is not always an option, for a variety of reasons. Therefore, a method to mitigate IMD effects can be used. In some embodiments, a method of mitigating IMB effects includes increasing the modulation order of at least one of the uplink bands. In some embodiments, this is based on an estimation of link budgets of the uplink bands, focusing the increase in modulation order on the aggressor, or Tx uplink with the greatest link margin.

Figure 3:
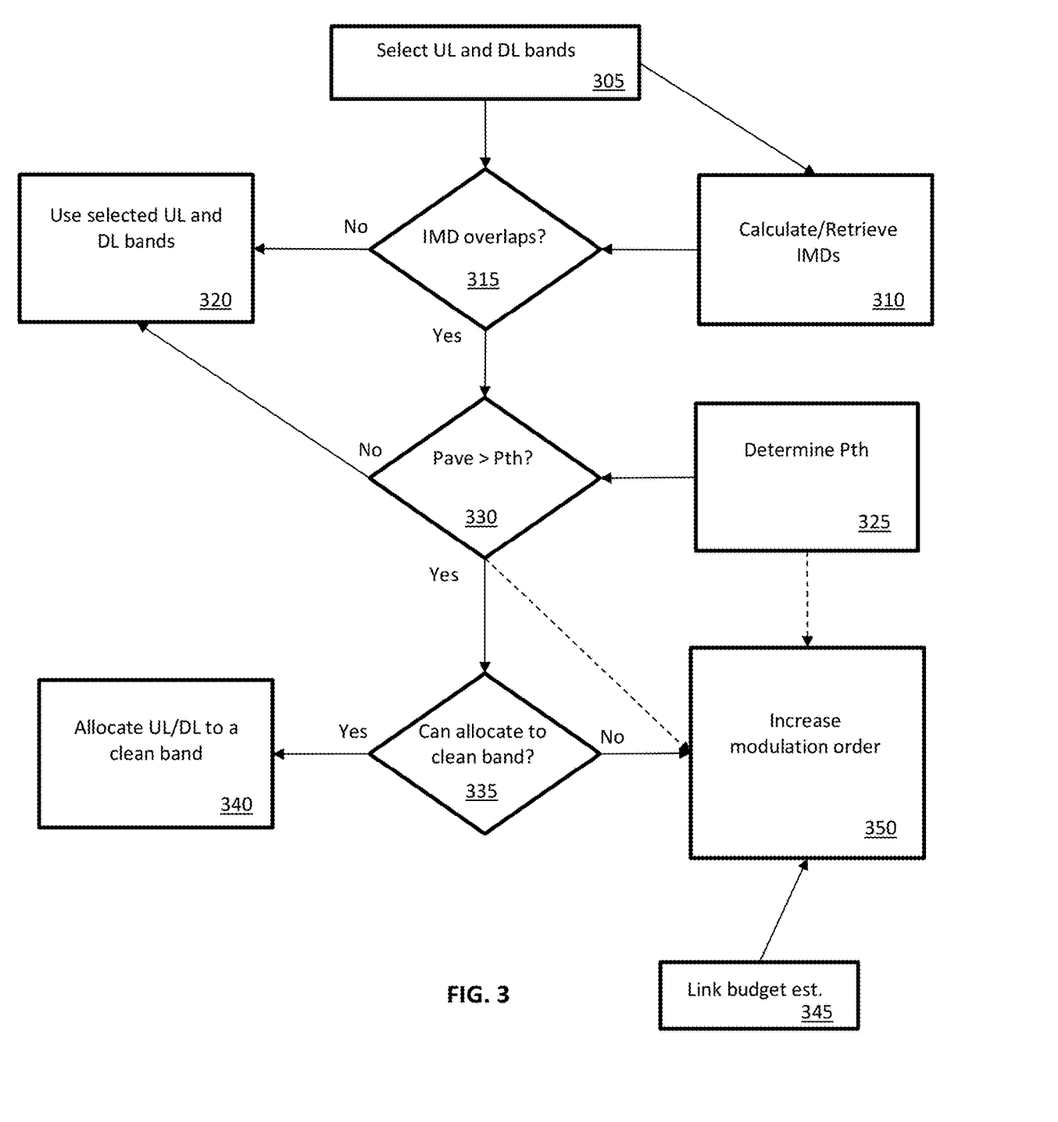
FIG. 3 shows an example flowchart of receive channel allocation to avoid/mitigate IMD.

FIG. 3 shows an example flowchart of an uplink/downlink allocation method with mitigated self desense. The example method is shown from the UE perspective with the UE making decisions and calculations: however, alternative embodiments include a remote server (such as at the base station) making some or all of the calculations and decisions, then passing the data to the UE. The initial choices for uplink UL and downlink DL bands are selected 305 by standard means. The IMD products are determined 310 for all available uplink and downlink band combinations. These can be determined by real-time calculation at the UE, or it can be retrieved from a look-up table (LUT). The initial uplink and downlink bands are referenced against 315 the determined IMB values to see if there are any IMD overlaps in the selected DL bands. If there are no overlaps (or if the DL bands are "clean" from IMD products produced by transmission over the selected UL bands/sub-bands) then communication proceeds 320 with the initially selected UL and DL bands. If not, then the average power level of the UL bands is calculated and compared 330 against a power threshold. If the average power is not above the threshold, then communication proceeds 320 with the initially selected UL and DL bands. If the average power is above the threshold, then further optimization is performed. For situations where the average power is equal to the threshold, the decision path goes whichever way the system is programmed.

In some embodiments, the threshold power is determined 325 by maximum sensitivity degradation calculations, either made in real time or presented in a LUT. FIGS. 6A-6D show example graphs for MSD calculations of $4^{th}$ (FIGS. 6A-6B) and $5^{th}$ (FIGS. 6C-6D) IMDs from UL bands B71 and B66 on DL band CB2.

The formula for the IMDs can be shown generally as:

$$\text{IMD}_n = c_1 * \text{Aggr}_1 + c_2 * \text{Aggr}_2 + c_3 * \text{Aggr}_3 + \ldots c_m * \text{Aggr}_m \quad \text{(equation 1)};$$

and $$n = \Sigma_{i=1}^{m} |c_i|; \text{ where } -n \leq c_i \leq n \quad \text{(equation 2)}$$

where $\text{IMD}_n$ is the frequency bandwidth (i.e., extent in frequency) of IMD order n, $c_i$ is the IMD coefficient (or IMD index) of the $i^{th}$ aggressor (e.g. UL) band m is the number of aggressor bands (can be more than two), and $\text{Aggr}_i$ is the $i^{th}$ aggressor bandwidth. In several cases, the IMD index value can be negative.

Figure 10:
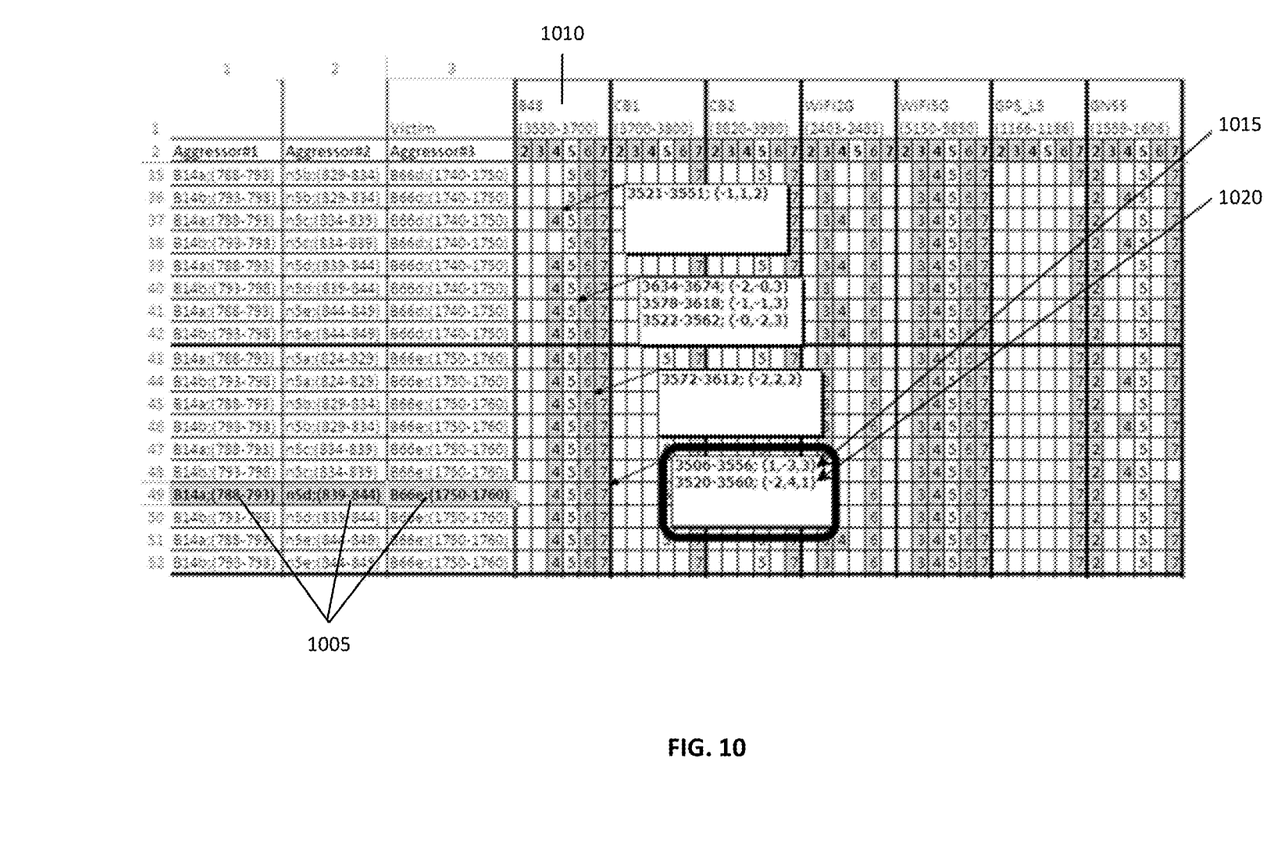
FIG. 10 shows an example of calculating the 7th order IMDs in a three-aggressor scenario.

FIG. 10 shows an example of calculating the $7^{th}$ order IMDs in a three-aggressor 1005 scenario (3 UL sub-bands: B14a at 788-793 MHz, n5d at 839-844, and B66e at 1750-1760 MHz) vs. a victim band 1010 (B48 at 3550-3500 MHz). Two IMDs are calculated based on the general formula in equation 1: the first 1015 as $1*\text{Aggr}_1+(-3)*\text{Aggr}_2+3*\text{Aggr}_3$, the second 1020 as $(-2)*\text{Aggr}_1+(-3)*\text{Aggr}_2+3*\text{Aggr}_3$. Note that for this example n=|1|+|-3|+|3|=|-2|+|-3|+|3|=7, showing that these are for $7^{th}$ order IMDs according to equation 2.

Figure 6A:
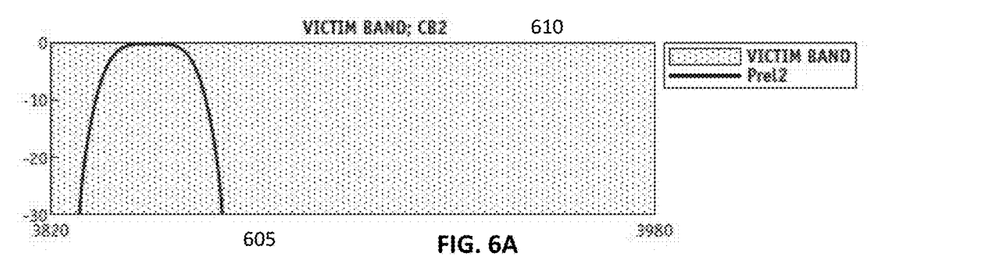
FIGS. 6A-6D show example graphs illustrating maximum sensitivity degradation (MSD) for IMD.
Figure 6B:
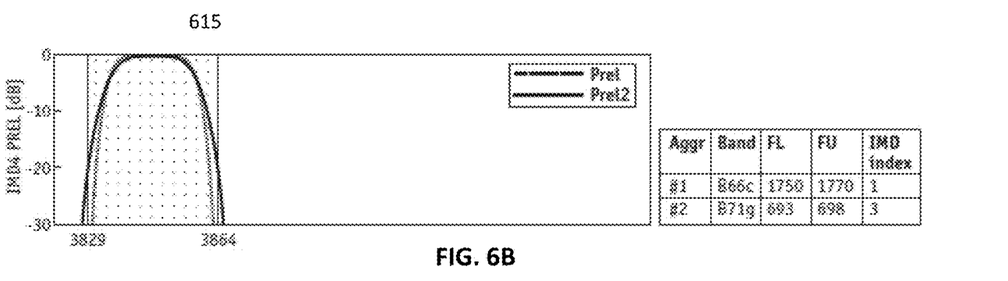
Figure 6C:
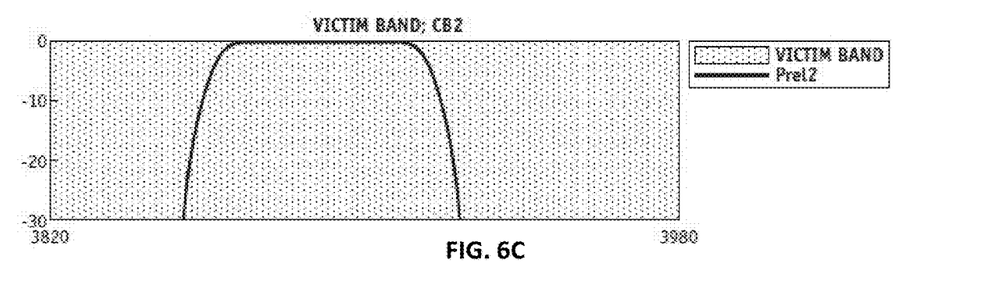
Figure 6D:
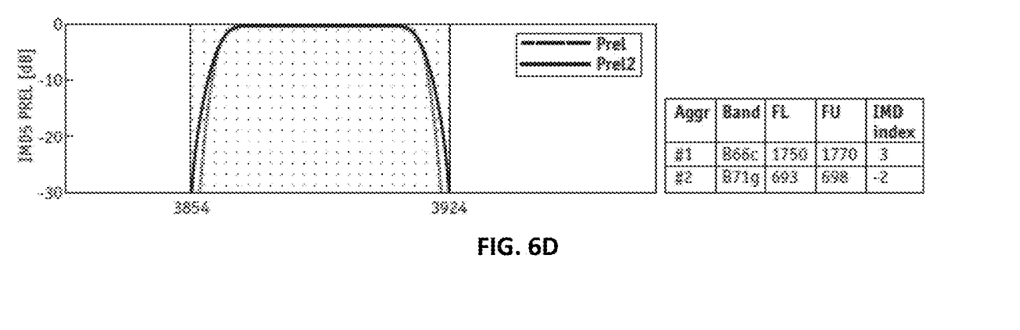

FIGS. 6A and 6B show the $4^{th}$ order IMD as $1*\text{B66c}+3*\text{B71g}$. FIGS. 6C and 6D show the $5^{th}$ order IMD as $3*\text{B66c}+(-2)*\text{B71g}$.

In some embodiments, the power threshold is determined by UE calibration and test data.

In some embodiments, if the average power level is above the threshold, then the UE determines 335 if there is an available "clean" band for new UL and DL allocation 340 and proceeds with respective UL band/sub-band allocations as a first optimization. In some embodiments, the UE does not check for an available "clean" band and just proceeds the secondary optimization 350. In some embodiments, the UE may proceed with the secondary optimization even if it checks and confirms availability of "clean" bands. In embodiments that are compliant with the 3GPP standards, allocation refers to allocation of "resource blocks" (RB) in frequency bands or sub-bands where resource blocks are frequency resource units allocated to a user, e.g., to a user equipment (UE). In some embodiments, frequency allocation is performed on an individual sub-carrier basis. For example, in NB-IoT (narrowband "internet of things") applications, a single sub-carrier can be used in UL. In some embodiments, the RB is composed on 12 sub-carriers. Where no clean band can be found (or can't be allocated for some reason), a secondary optimization 350 is performed. In some embodiments, UE calibration data can be used in determining the power threshold 325 at which Rx desense starts to occur. In other embodiments a predetermined lookup table of data can be utilized, or the interfering IMD power level can be monitored in real time by the Rx channel and thereby determining the power threshold. Yet another alternative is to calculate the projected level of desense using the expected transmit power levels, the frequencies of the uplink transmissions, the downlink frequencies being utilized, and the non-linear behavior of the cellular RF front end circuitry. This calculation will follow commonly known methods for determining the maximum sensitivity degradation (MSD) allowed by governing standards (e.g. 3GPP standards).

This power threshold can be utilized to more accurately determine the modulation scheme/order impact on each of the UL bands in the secondary optimization 350.

The secondary optimization 350 utilizes a link budget estimation 345 over the selected UL bands (and, optionally, the UE calibration data), e.g. for two or more UL bands for simultaneous UL transmission. If there is sufficient link budget margin in either one of the UL, then the UE increases the modulation order of the link with the greatest link margin to the highest possible order supported by the link budget. In some embodiments, if both uplinks have similar margins, then the UE increases the modulation order for a UL with a higher-value IMD index/coefficient as is described herein in reference to FIG. 5C. In some embodiments, if both uplinks have similar margins, then the UE increases modulation orders for all ULs with sufficient margin.

Figure 4:
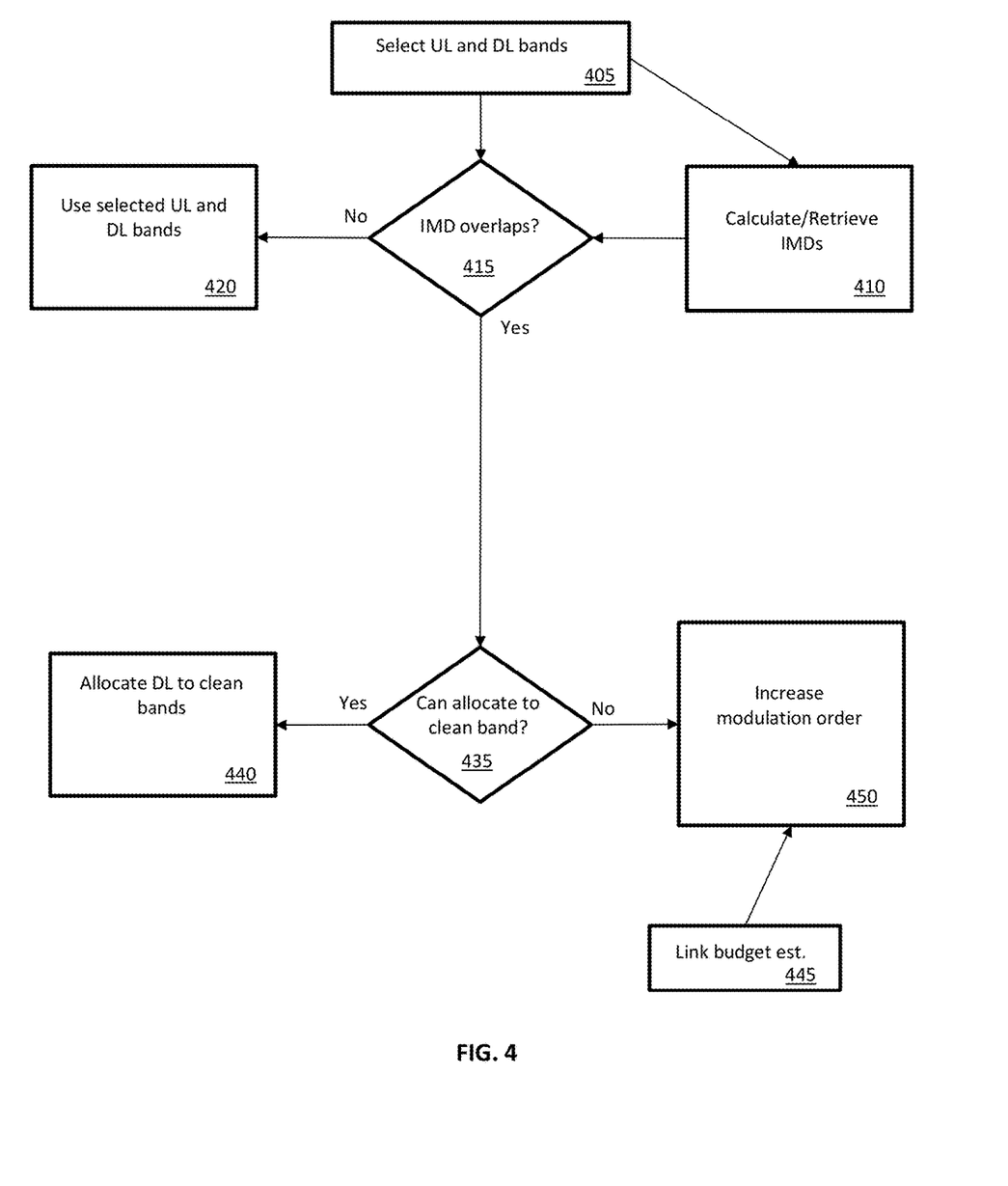
FIG. 4 shows an example flowchart of receive channel allocation to avoid/mitigate IMD, without a power test.

FIG. 4 shows an alternative example flowchart for a method for uplink/downlink allocation method with mitigated self-desense. The initial choices for uplink UL and downlink DL bands are selected 405 by standard means. The IMB products are determined 410 for all available uplink and downlink band combinations. These can be determined by real-time calculation at the UE, or it can be retrieved from a look-up table (LUT). The initial uplink and downlink bands are referenced against 415 the determined IMB values to see if there are any IMD overlaps in the selected DL bands. If there are no overlaps (or if the DL bands are "clean" for the selected UL bands/sub-bands) then communication proceeds 420 with the initially selected UL and DL bands. No power threshold is determined or compared to: the UE just checks 435 if a clean band can be allocated and either performs the first optimization (clean band allocation) 440 or second optimization 450 depending on the result. The second optimization 450 is still based on a link budget estimation 445 but might not have UE calibration data available. This method can be used, for example, when the UE is determined to be far from the base station, so a high-power Tx can be assumed.

Figure 5A:
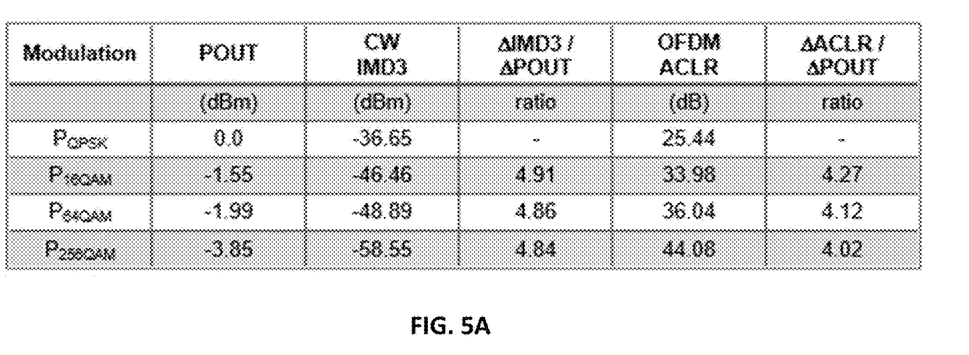
FIGS. 5A-5C show example charts for some sample modulation adjustments.
Figure 5B:
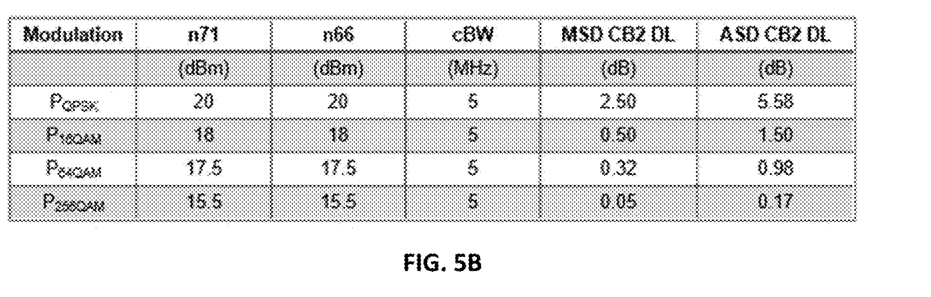
Figure 5C:
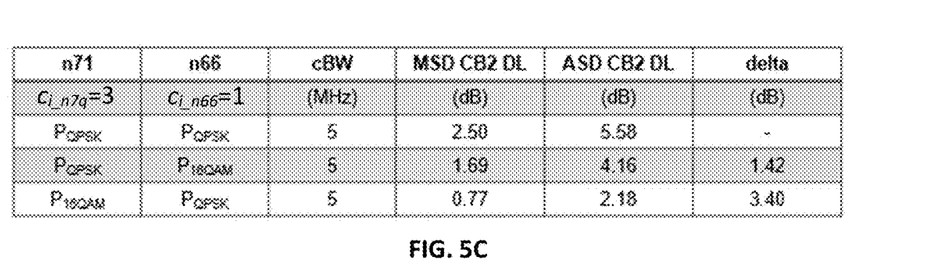

FIGS. 5A to 5C show example parameters for different modulation schemes in increasing order from QPSK to 256QAM. As shown in the charts, increasing the modulation scheme decreases the average power (typically 2 to 4.5 dB lower for the same UE power class rating) of the UL bands, thereby mitigating the self-desense by IMD. In addition, the throughput is potentially increased (e.g. $2^{2bits}$ for QPSK vs. $2^{4bits}$ for 16QAM).

The table in FIG. 5A illustrates the coherent wave (CW) generalized 3rd order IMD (IMD3) behavior (CW IMD3) versus the corresponding output power Pout values normalized to 0 dBm for QPSK. Also shown in FIG. 5A is the decreased sensitivity of IMD3 and ACLR (adjacent channel leakage ratio) to variations in Pout with increasing modulation order.

The table in FIG. 5B illustrates the results of a simulation for a case of 2 uplinks (2UL) over 3GPP NR (New Radio) bands n71 and n66 and the maximum and actual sensitivity degradation (MSD and ASD, respectively) for DL over the C-band 2 (CB2) band that is specific to United States and ranges from 3.8 GHz to 3.98 GHz. The ASD values are decreasing with increasing modulation order. FIG. 5C illustrates the fact that increasing the modulation order of frequency with higher IMD index $c_i$ has greatest impact on reducing the desense and hence the preference for ULs associated with larger $c_i$ indices when multiple ULs may have similar margins.

Figure 7A:
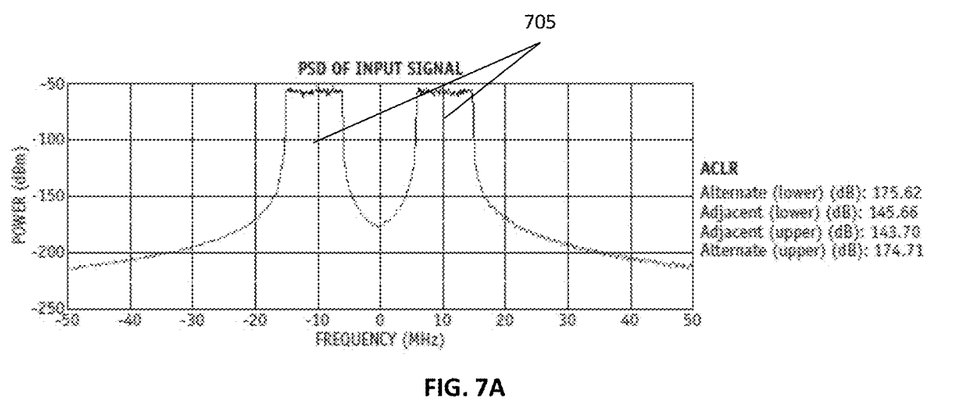
FIGS. 7A-7D show example graphs illustrating simulation results of modulation optimization for IMD.
Figure 7B:
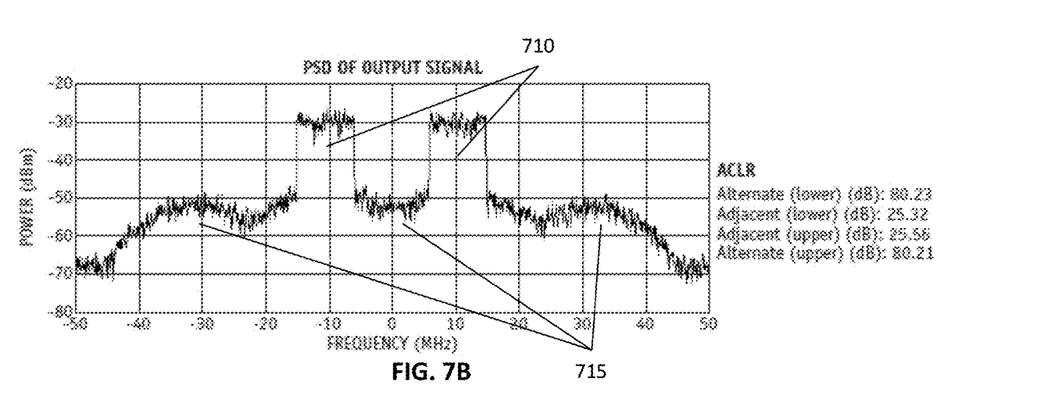
Figure 7C:
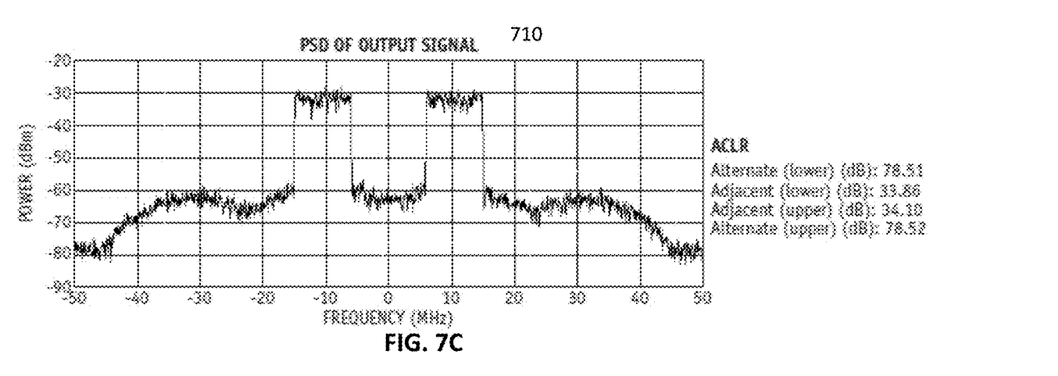
Figure 7D:
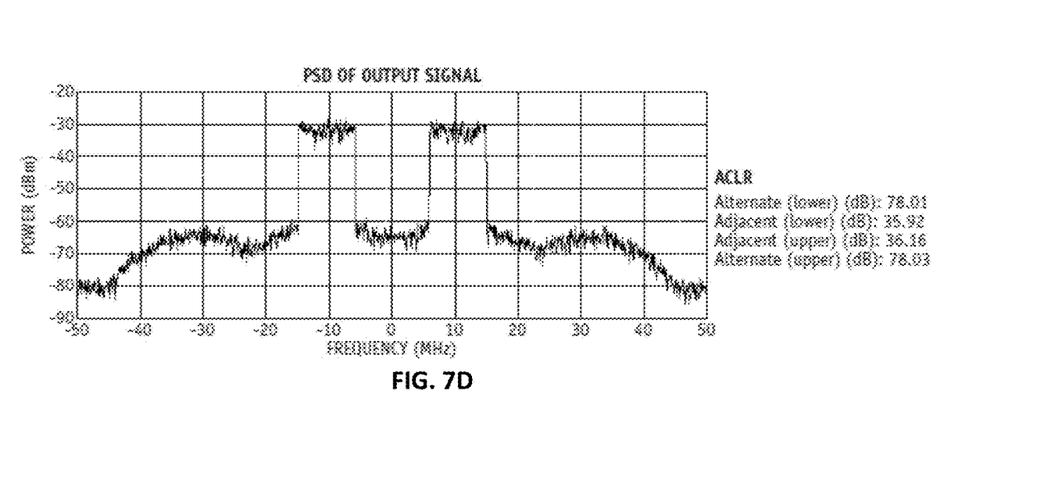

In FIG. 5C, a "delta" reduction of 3.4 dB is obtained when (3x)n71 (i.e., IMD index of 3) is moved to 16QAM from QPSK and a "delta" reduction of 1.42 dB is obtained when (1x)n66 (i.e., IMD index of 1) is moved to 16 QAM from QPSK. It should be noted in FIG. 5C that the link margin over n71 (about 700 MHz uplink) is in general expected to be larger than n66 (about 1800 MHz uplink) as n71 is a relatively lower frequency band (that is, the link budget for n71 (about 700 MHz uplink) is expected to have more margin than n66 (about 1800 MHz uplink) as n71 is a relatively lower frequency band with better propagation properties and therefore fundamentally greater range capability). FIGS. 7A-7D show example simulated effects of increasing modulation schemes on IMD de-sense. FIG. 7A shows an input signal 705 and the corresponding output without optimization. As shown, the output shows power levels outside the signal are close in power to the signal (the peaks around 5-15 MHz, + and −), so there is significant desense. FIGS. 7B-7D show increases in the modulation order, each step producing an increasing decrease adjacent channel leakage power (ACLR). As the average power decreases, the signal becomes more distinct from the surrounding IMDs, thereby reducing self-desense. Similar to a $3^{rd}$ order IMD effect, the ACLR follows a similar improvement in the out-of-band interference when the average power is reduced. As shown in FIGS. 7A-7D, a non-linear device having a $3^{rd}$ order non-linearity will improve its non-linear behavior (lower impairment) with the lower input power caused by increasing the modulation order.

Figure 8A:
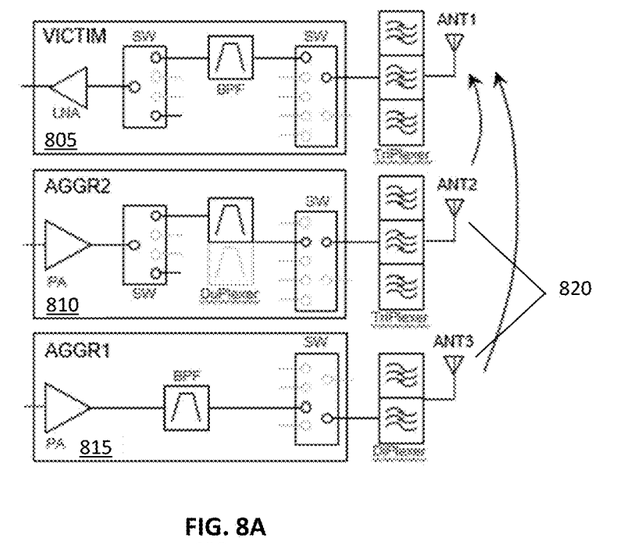
FIGS. 8A-8B show example system configurations for desense reduction.
Figure 8B:
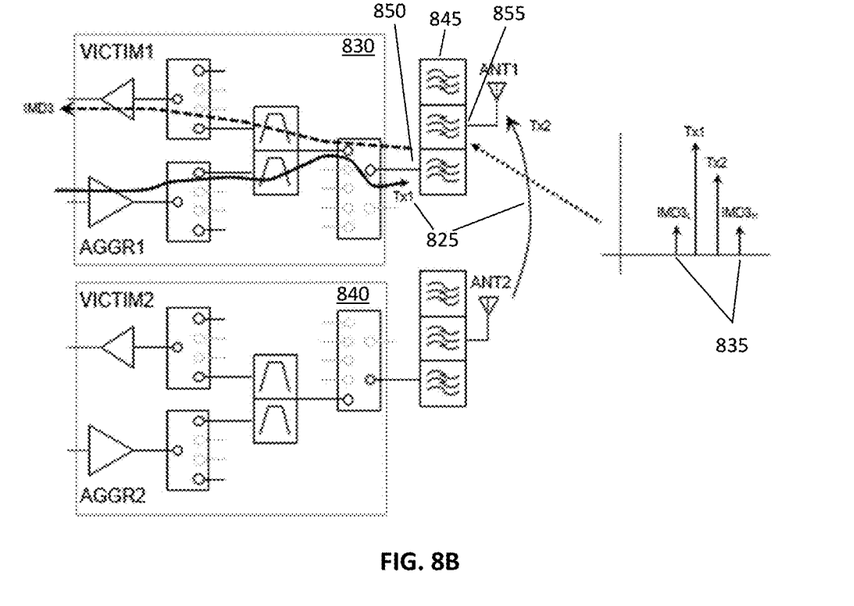

FIGS. 8A and 8B show example scenarios where the IMD overlap and MSD reduction techniques described herein can be applied. FIG. 8A shows an example where the first aggressor transmitter 815 and the second aggressor transmitter 810 are simultaneously transmitting on separate antennas 820 (alternate embodiments of the system can transmit both on one single antenna). The victim receiver receiving in victim DL bands can also have a receive path on a distinct module 805 or can be combined 830 with one or more of the aggressor transmitters, as shown in FIG. 8B. How the RF front end is configured can impact the UE's susceptibility to self-desense. For a given configuration, the UE can determine, by stored look-up tables or real-time calculations, the level of desense expected for the transmitted aggressor power levels for a given victim band.

FIG. 8B shows an example system where the transmit IMD products 835 (in this example, order 3, low and high) are generated throughout the circuit components 830 and 840 of the RF front end. IMD overlaps occur when the $IMD_n$ frequency falls in the victim band. As shown in FIG. 8B, the triplexer 845 is shown having both Tx signals, Tx1 and Tx2, 825 arrive at its input 850 and output 855 ports. The triplexer 845 has finite linearity and can be a source of IMD products. If any $IMD_n$ frequency aligns with the Rx victim bandwidth, the IMD product will pass unhindered through the Rx receive path and, if the level is above a targeted sensitivity level, it can desense the Rx receive.

Figure 9A:
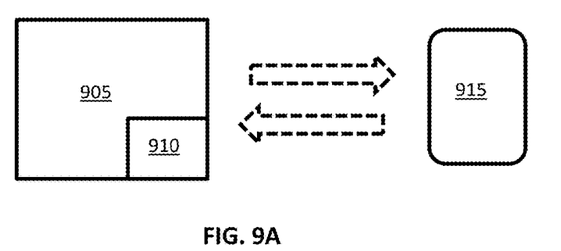
FIGS. 9A-9E show example UE/base station configurations.
Figure 9B:
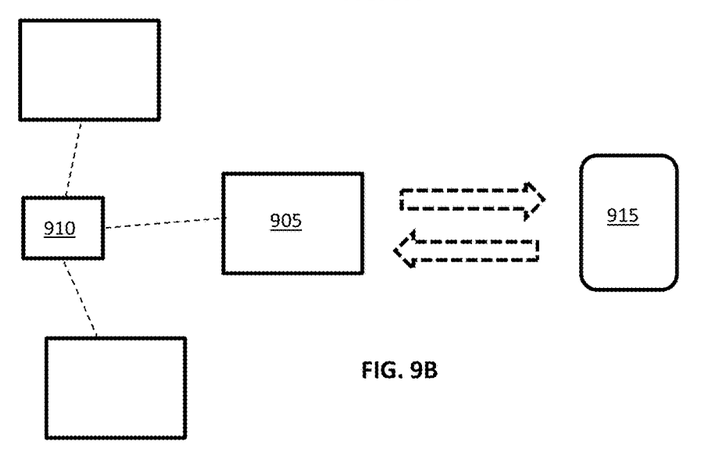

FIGS. 9A-9E show example base station and UE configurations for the scenarios where the IMD overlap, and MSD reduction techniques described herein can be applied. FIG. 9A shows a base station 905 with a computer control 910 in communications with user equipment 915, such as a mobile phone or tablet. The method can be carried out on the UE 915 (selecting Tx and Rx channels for itself) or on the computer 910 at the base station 905, or in some combination of the two (for example, the phone selecting channels, but the remote computer making IMD calculations). In the embodiments where the computer 910 performs one or more steps of the method, the relevant information (e.g., channel allocation, IMD values, modulation selections, real time measurements done at the UE Rx receive path, such as the present desense level, link budget margins, etc.) can be sent from the base station 905 to the UE 915. FIG. 9B shows a similar setup, but where the computer control 910 is remote also from the base station 905 (e.g., central base station control system). The same options given for 9A also apply to 9B.

Figure 9C:
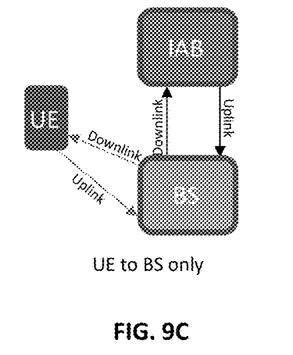
Figure 9D:
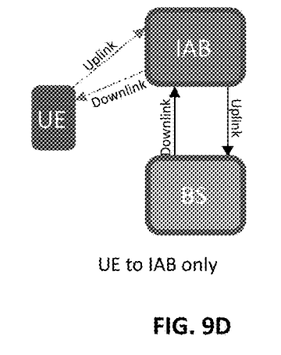
Figure 9E:
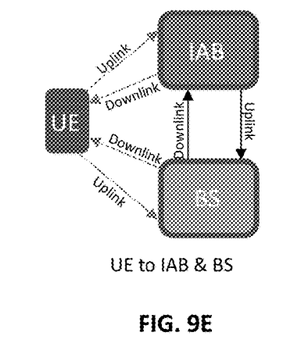

FIGS. 9C-9E show example configurations with the inclusion of an IAB (integrated access and backhaul). FIG. 9C shows an example with UE directly communicating (UL and DL) with the base station. FIG. 9D shows an example of the UE only communicating with the IAB. FIG. 9E shows an example of the UE communicating with both the base station and the UE. The dashed lines in FIGS. 9C-9E indicate UL and DL that can cause self desense.

Figure 11:
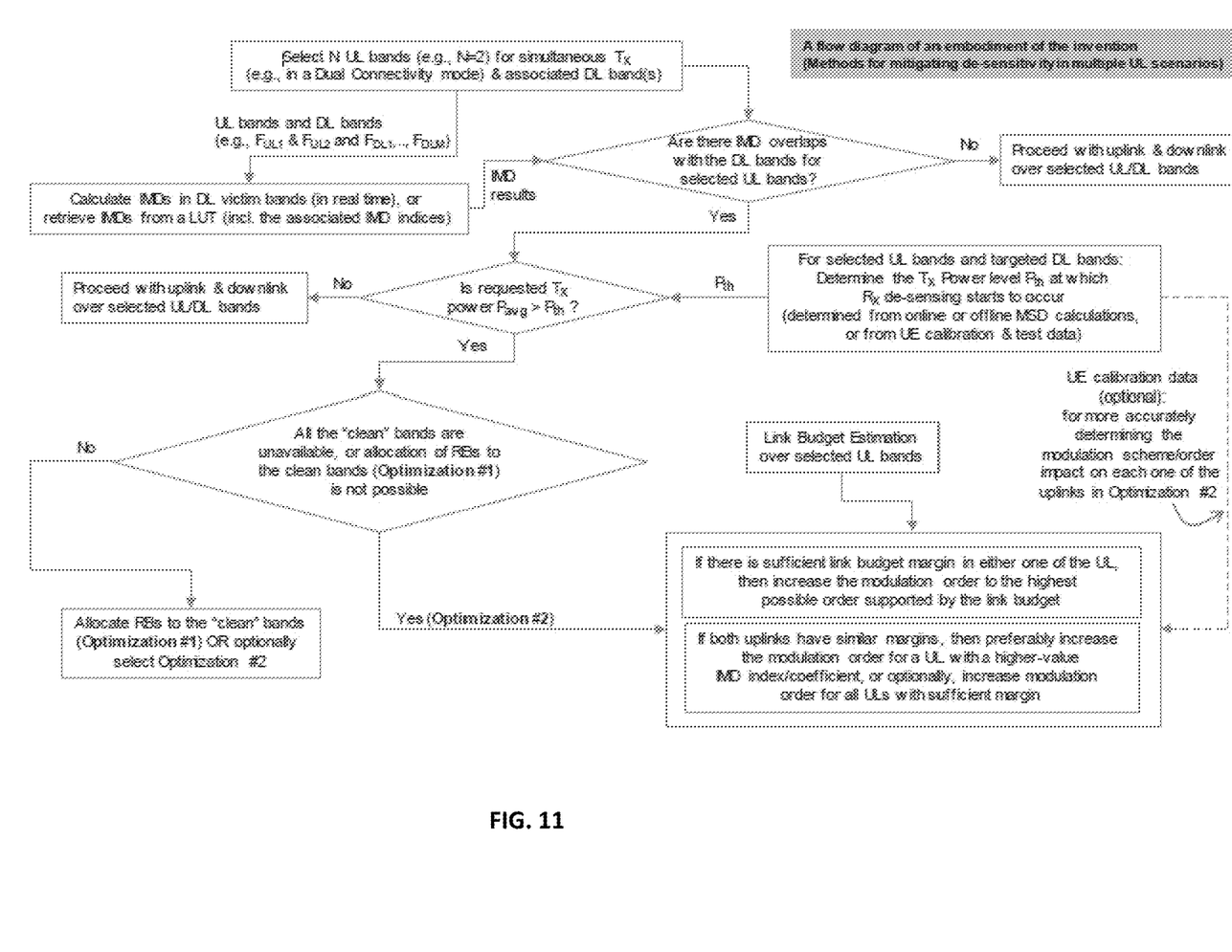
FIG. 11 shows an example of an embodiment of the method/system.

FIG. 11 shows an example diagram for an embodiment of mitigating de-sensitivity in multiple uplink scenarios.

Circuits and devices in accordance with the present invention may be used alone or in combination with other components, circuits, and devices. Embodiments of the present invention may be fabricated as integrated circuits (ICs), which may be encased in IC packages and/or in modules for ease of handling, manufacture, and/or improved performance. In particular, IC embodiments of this invention are often used in modules in which one or more of such ICs are combined with other circuit blocks (e.g., filters, amplifiers, passive components, and possibly additional ICs) into one package. The ICs and/or modules are then typically combined with other components, often on a printed circuit board, to form an end product such as a cellular telephone, laptop computer, or electronic tablet, or to form a higher-level RF module which may be used in a wide variety of products, such as vehicles, test equipment, medical devices, etc. Through various configurations of modules and assemblies, such ICs typically enable a mode of communication, often wireless communication.

A number of embodiments of the invention have been described. It is to be understood that various modifications may be made without departing from the spirit and scope of the invention. For example, some of the steps described above may be order independent, and thus can be performed in an order different from that described. Further, some of the steps described above may be optional. Various activities described with respect to the methods identified above can be executed in repetitive, serial, or parallel fashion.

It is to be understood that the foregoing description is intended to illustrate and not to limit the scope of the invention, which is defined by the scope of the following claims, and that other embodiments are within the scope of the claims. (Note that the parenthetical labels for claim elements are for ease of referring to such elements, and do not in themselves indicate a particular required ordering or enumeration of elements; further, such labels may be reused in dependent claims as references to additional elements without being regarded as starting a conflicting labeling sequence).

The invention claimed is:

1. A method for reducing self-desense in a downlink band due to two or more uplink bands of an uplink transmission, the method comprising:
    selecting two or more uplink bands;
    selecting a downlink band for a device using the two or more uplink bands;
    determining, by computation or retrieval or direct measurement, intermodulation distortion values for available uplink band combinations and available downlink bands;
    using the intermodulation distortion values to determine if there is intermodulation distortion for the downlink band given the two or more uplink bands;
    in response to determining presence of intermodulation distortion for the downlink band, comparing an average power of the two or more uplink bands to a power threshold, and when the average power exceeds the power threshold, performing one of:
    (a) allocating the uplink transmission to a clean band determined to be free of said intermodulation distortion; or
    (b) when a clean band is unavailable for allocation, determining a link margin for each of the two or more uplink bands to identify the uplink band having the greatest link margin, and subsequently increasing a modulation order of the identified uplink band.

2. The method of claim 1, wherein the selecting two or more uplink bands is performed in at least one transmitter of the uplink transmission.

3. The method of claim 1, wherein the determining intermodulation distortion values is performed in at least one transmitter of the uplink transmission.

4. The method of claim 1, further comprising increasing the modulation order of one or more uplink bands of the two or more uplink bands that has a greatest link margin, wherein the increasing the modulation order is performed in at least one transmitter of the uplink transmission.

5. The method of claim 2, wherein the at least one transmitter is comprised in user equipment.

6. The method of claim 1, where the selecting uplink bands is performed in a receiver of the uplink transmission.

7. The method of claim 1, wherein the determining intermodulation distortion values is performed in a receiver of the uplink transmission.

8. The method of claim 1, further comprising increasing the modulation order of one or more uplink bands of the two or more uplink bands that has a greatest link margin, wherein the increasing the modulation order is performed in a receiver of the uplink transmission.

9. The method of claim 6, wherein the receiver of is comprised in one or more base stations, or one or more integrated access and backhaul (IAB) units, or both.

10. The method of claim 1, wherein the selecting uplink bands is performed in part in a receiver of the uplink transmission and in part in a transmitter of the uplink transmission.

11. The method of claim 1, wherein the determining intermodulation distortion values is performed in part in a receiver of the uplink transmission and in part in a transmitter of the uplink transmission.

12. The method of claim 1, further comprising increasing the modulation order of one or more uplink bands of the two or more uplink bands that has a greatest link margin, wherein the increasing the modulation order is performed in part in a receiver of the uplink transmission and in part in a transmitter of the uplink transmission.

13. The method of claim 1, wherein the method is implemented on user equipment.

14. The method of claim 13, wherein the user equipment is a mobile phone.

15. The method of claim 1, wherein the method is implemented on a computer controlling a base station in communications with user equipment and the method further comprises the base station sending instructions on channel allocation and modulation selection to the user equipment.

16. The method of claim 15, wherein the computer is at the base station.

17. A method for reducing self-desense in a downlink band due to two or more uplink bands of an uplink transmission, the method comprising:
    selecting two or more uplink bands;
    selecting a downlink band for a device using the two or more uplink bands;
    determining, by computation or retrieval or direct measurement, intermodulation distortion values for available uplink band combinations and available downlink bands;
    using the intermodulation distortion values to determine if there is intermodulation distortion for the downlink band given the two or more uplink bands;
    determining link margins of each of the two or more uplink bands by link budget estimation or retrieval or direct measurement;
    increasing a modulation order of one or more uplink bands of the two or more uplink bands that has a greatest link margin; and
    increasing a modulation order of an uplink band of the two or more uplink bands that does not have the greatest link margin on condition that link margins of the two or more uplink bands have link margins within a threshold difference.

* * * * *